United States Patent
Goodno et al.

(10) Patent No.: US 10,267,992 B1
(45) Date of Patent: Apr. 23, 2019

(54) FIBER LAUNCHER

(71) Applicants: Gregory D. Goodno, Los Angeles, CA (US); Joshua E. Rothenberg, Los Angeles, CA (US); James G. Ho, Los Angeles, CA (US)

(72) Inventors: Gregory D. Goodno, Los Angeles, CA (US); Joshua E. Rothenberg, Los Angeles, CA (US); James G. Ho, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/709,052

(22) Filed: Sep. 19, 2017

(51) Int. Cl.
| | |
|---|---|
| *G02B 6/28* | (2006.01) |
| *G01J 1/42* | (2006.01) |
| *G02B 6/42* | (2006.01) |
| *H01S 3/067* | (2006.01) |
| *H01S 3/30* | (2006.01) |
| *F41H 13/00* | (2006.01) |
| *G02B 27/10* | (2006.01) |

(52) U.S. Cl.
CPC .......... *G02B 6/2848* (2013.01); *G01J 1/4257* (2013.01); *G02B 6/4206* (2013.01); *G02B 6/4214* (2013.01); *H01S 3/0675* (2013.01); *F41H 13/0056* (2013.01); *G02B 27/1006* (2013.01); *H01S 3/302* (2013.01)

(58) Field of Classification Search
None
See application file for complete search history.

(56) References Cited

U.S. PATENT DOCUMENTS

| | | |
|---|---|---|
| 5,113,244 A | 5/1992 | Curran |
| 6,215,925 B1 | 4/2001 | Kaneyama |
| 8,441,718 B2 | 5/2013 | Mead |
| 9,689,740 B2 | 6/2017 | Klennert |
| 2009/0153968 A1* | 6/2009 | Goodno ............... G02B 6/2931 359/571 |
| 2011/0249692 A1 | 10/2011 | Honea et al. |
| 2016/0109290 A1 | 4/2016 | Klennert |
| 2017/0201059 A1 | 7/2017 | Villeneuve et al. |

FOREIGN PATENT DOCUMENTS

WO 2015017071 A1 2/2015

* cited by examiner

*Primary Examiner* — Jerry Rahll
(74) *Attorney, Agent, or Firm* — Tarolli, Sundheim, Covell & Tummino LLP

(57) ABSTRACT

An optical fiber launcher assembly can include a low precision fiber array that outputs a plurality of optical signals from a given side that are input into an opposing side. The optical fiber launcher assembly can also include a corrective optic aligned with and spaced apart from the low precision fiber array. The plurality of optical signals output from the low precision array to the corrective optic have a given trajectory and optical signals output from the corrective optic have a substantially parallel trajectory different from the given trajectory.

20 Claims, 7 Drawing Sheets

FIBER LAUNCHER

TECHNICAL FIELD

The present disclosure relates to a fiber launcher assembly and methods for forming the fiber launcher assembly.

BACKGROUND

Coherent beam combining (CBC) (also referred to as coherent addition) of lasers is a method of power scaling. CBC allows an increase in the output power and brightness of an array of lasers. The term CBC may apply to fiber lasers. As the capability of pumping and/or cooling of a single laser is limited, several similar lasers can be locked in phase and geometrically combined to form a single beam with higher power and preserved beam quality.

Spectral beam combining (SBC), which is also referred to as wavelength beam combining, wavelength combining or incoherent beam combining, denotes a class of techniques within the more general area of power scaling by light beam combining. SBC attempts to combine several high-power laser beams, each operating at a different wavelength, using a dispersive optical system to form a single beam with higher power and preserved beam quality.

A fiber laser is a laser in which the active gain medium is an optical fiber doped with rare-earth elements such as erbium, ytterbium, neodymium, dysprosium, praseodymium, thulium or holmium. Fiber lasers are related to doped fiber amplifiers, which provide light amplification without resonant oscillation. Fiber nonlinearities, such as stimulated Raman scattering or four-wave mixing can also provide gain and thus serve as gain media for a fiber laser.

SUMMARY

One example relates to an optical fiber launcher assembly that includes a low precision fiber array that outputs a plurality of optical signals from a given side that are input into an opposing side. The optical fiber launcher assembly can also include a corrective optic aligned with and spaced apart from the low precision fiber array. The plurality of optical signals output from the low precision fiber array to the corrective optic have a given trajectory and optical signals output from the corrective optic have a substantially parallel trajectory different from the given trajectory.

Another example relates to a method that includes performing metrology on a plurality of light beams output by a low precision fiber array to determine a composite profile for the plurality of light beams. The method also includes calculating a corrective map for a corrective optic and fabricating the corrective optic based on the corrective map. The method further includes affixing the corrective optic at a predetermined distance from a low precision fiber array. Light beams output by the corrective optic propagate in a substantially parallel direction.

Yet another example relates to a method that can include performing metrology on a plurality of light beams that pass through a low precision fiber array to determine a composite profile for the plurality of light beams. The method can also include fabricating the corrective optic based on a corrective map that characterizes a surface height of a plurality of microlenses in the corrective optic, and the corrective map is based on the composite profile. Light beams output by the corrective optic propagate in a substantially parallel direction.

DETAILED DESCRIPTION

This disclosure relates to a fiber launcher assembly that includes a low precision fiber array in optical communication with a corrective optic that compensates for errors originating in the fiber array. In this manner, beams emitted from the fiber launcher assembly appear to have originated from a high-precision fiber array. The fiber launcher assembly can be employed as a source for a diffraction-limited laser beam combiner at a fraction of the complexity and/or cost of a high precision array.

In some examples, the fiber launcher assembly can be scaled to fiber counts of 2-10,000. Moreover, fiber launcher assemblies with a fiber count of about 100-10,000 may be of interest for megawatt (MW) class laser weapons systems and/or for adaptive phased array applications. In particular, such laser systems may be employed in focal beam shaping to implement material processing.

Figure 1:
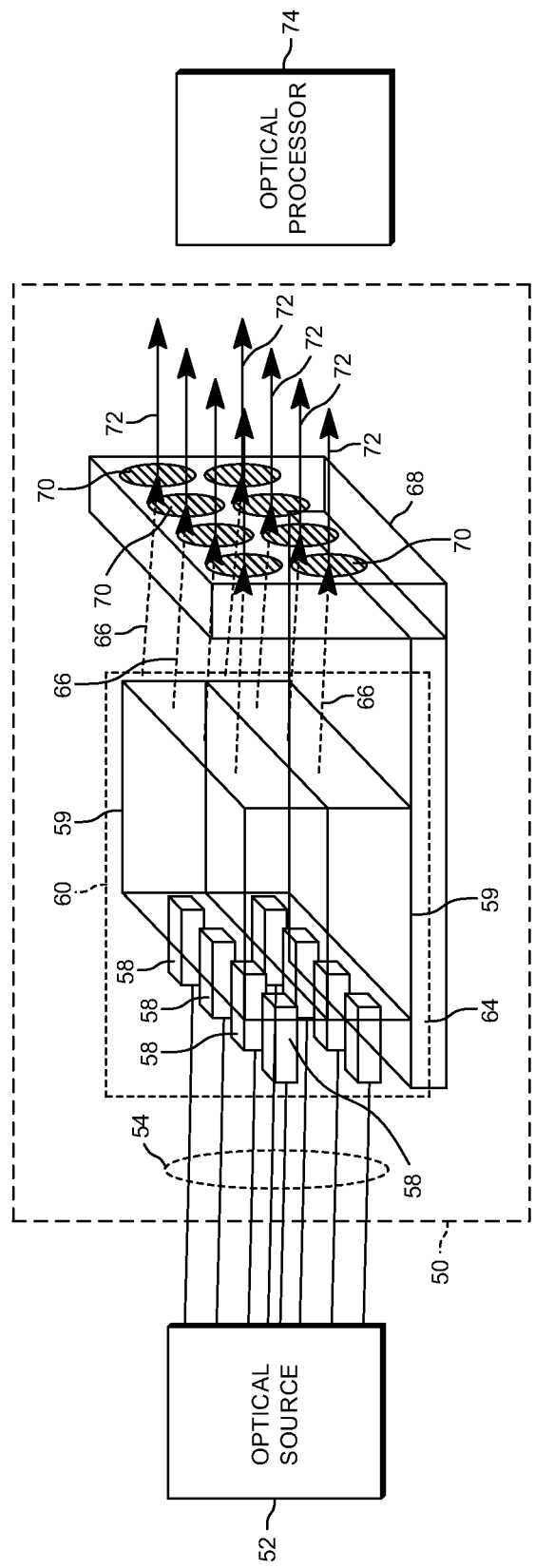
FIG. 1 illustrates an example of a fiber launcher assembly.

FIG. 1 illustrates an example of a fiber launcher assembly 50 for laser combining. The fiber launcher assembly 50 (or simply a fiber launcher) can be coupled to an optical source 52 that can provide R number of optical signals to a corresponding R number of optical fibers 54 (such as pigtails) of the fiber launcher assembly 50, where R is an integer greater than or equal to two (2). Moreover, it is understood that the optical source 52 may be representative of multiple optical sources.

The fiber launcher assembly 50 includes R number of optical inputs 58 that are rigidly attached to optical structures 59 to form a low precision fiber array 60. That is, a portion of the optical fibers 54, the optical inputs 58 and the optical structures 59 are constituent components of the low precision fiber array 60. Each optical input 58 could be implemented as an endcap of a corresponding optical fiber 54. The low precision fiber array 60 can be formed of one (1) or more optical structures 59 that allow light to pass from a side attached to the optical inputs 58 to an opposing side. The one (1) or more optical structures 59 may be stacked horizontally or vertically. In the example illustrated in FIG. 1, two (2) optical structures 59 are illustrated, but in other example, more or less optical structures 59 could be employed. It is to be understood that although FIG. 1 illustrates the optical inputs 58 being face-mounted onto the optical structures 59, other configurations could be employed, such as a configuration illustrated in FIG. 6.

As used herein, the term "low precision fiber array" denotes a fiber array wherein a pitch of fiber cores of the optical fibers 54 that are coupled to the optical inputs 58 (fiber tip positions) have a root mean squared (RMS) variance between 1 micrometers (μm) to about 30 μm. That is, the position of the optical inputs 58 can have an alignment tolerance of up to about 30 µm. The low precision fiber array 60 can be affixed to a base 64.

FIG. 1 includes an example trajectory 66 of light beams output by the low precision fiber array 60. The light beams output by the low precision fiber array 60 are provided to a corrective optic 68 that include R number of microlenses 70. Each of the R number of microlenses 70 adjusts the trajectory 66 of a corresponding light beam to a corrected trajectory 72.

The corrective optic 68 can be affixed to the base 64. Moreover, the corrective optic 68 can be fabricated with a relatively simple machining process, such as computer numerical control (CNC) machining techniques in a manner described in detail herein.

The output of the corrective optic 68 appears similar to an output of a high precision fiber array. As used herein, the term "high precision fiber array" denotes a fiber array wherein a pitch of the fiber cores of the optical fibers 54 coupled to the optical inputs 58 (fiber tip positions) 4 and to the one or more optical structure(s) 59 has a root mean squared (RMS) variance less than about 1 µm. The output of the corrective optic 68 can be provided to an optical processor 74. The optical processor 74 can be, for example, a beam combiner, such as a coherent beam combiner (CBC) or a spectral beam combiner (SBC). In such a situation, the optical processor 74 can output a combined light (laser) beam that can be employed, for example, in a weapons system or a material processing system. In other examples, the optical processor 74 could be an information transmission system, such as a multiplexer.

The fiber launcher assembly 50 can be fabricated with relatively simple and inexpensive processes. In particular, the fiber launcher assembly 50 can be formed without metal components and/or organic adhesive. Thus, the fiber launcher assembly 50 can achieve a nearly zero (0) optical absorption. Additionally, the fiber launcher assembly 50 can be scaled to nearly any number of optical fibers 54 (e.g., 2 to 10,000 or more). Furthermore, due to the relatively high pitch alignment tolerance of the low precision fiber array assembly, greater density (reduced pitch) of the optical fibers 54 can be achieved than in a high precision fiber array.

Figure 2:
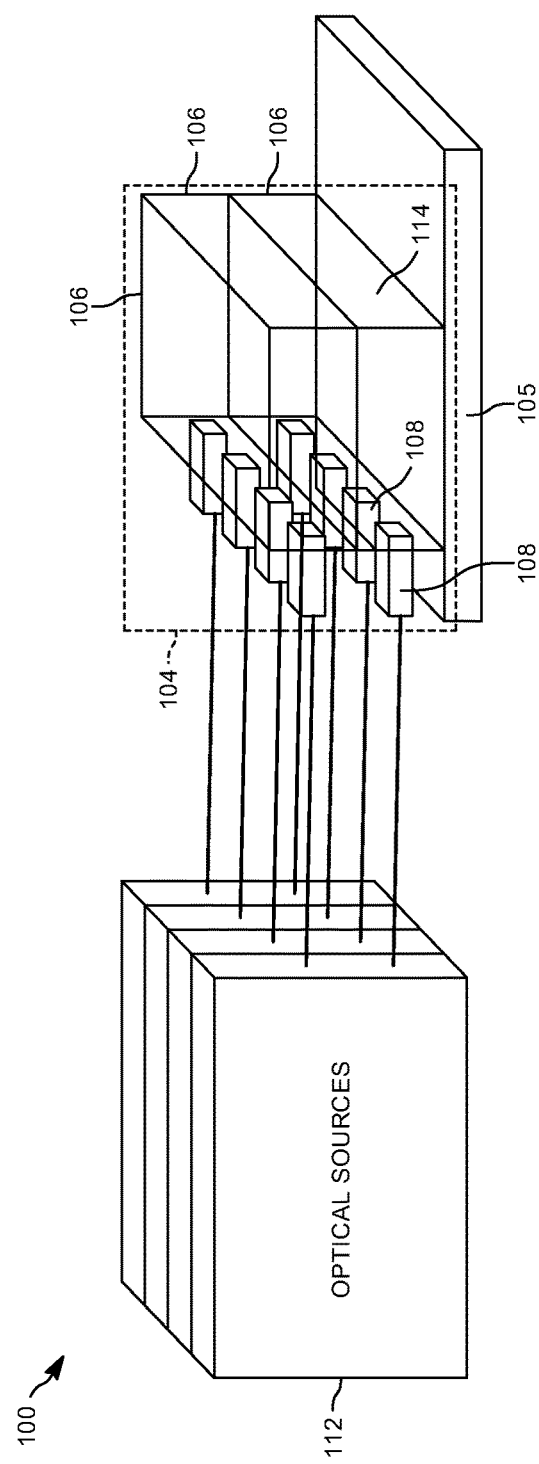
FIGS. 2, 3 and 4 illustrate stages of an example process of fabricating a fiber launcher assembly.
Figure 3:
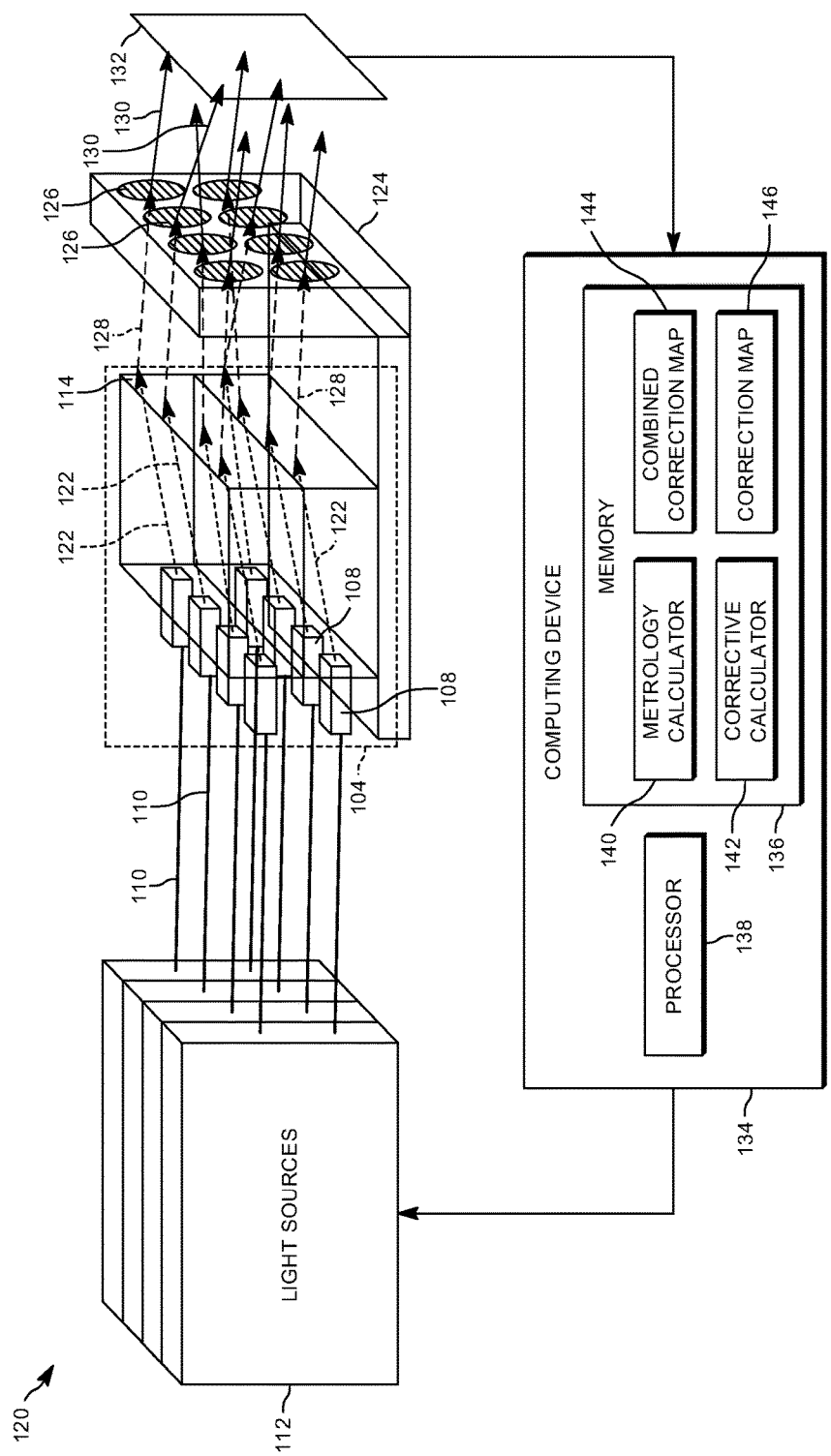
Figure 4:
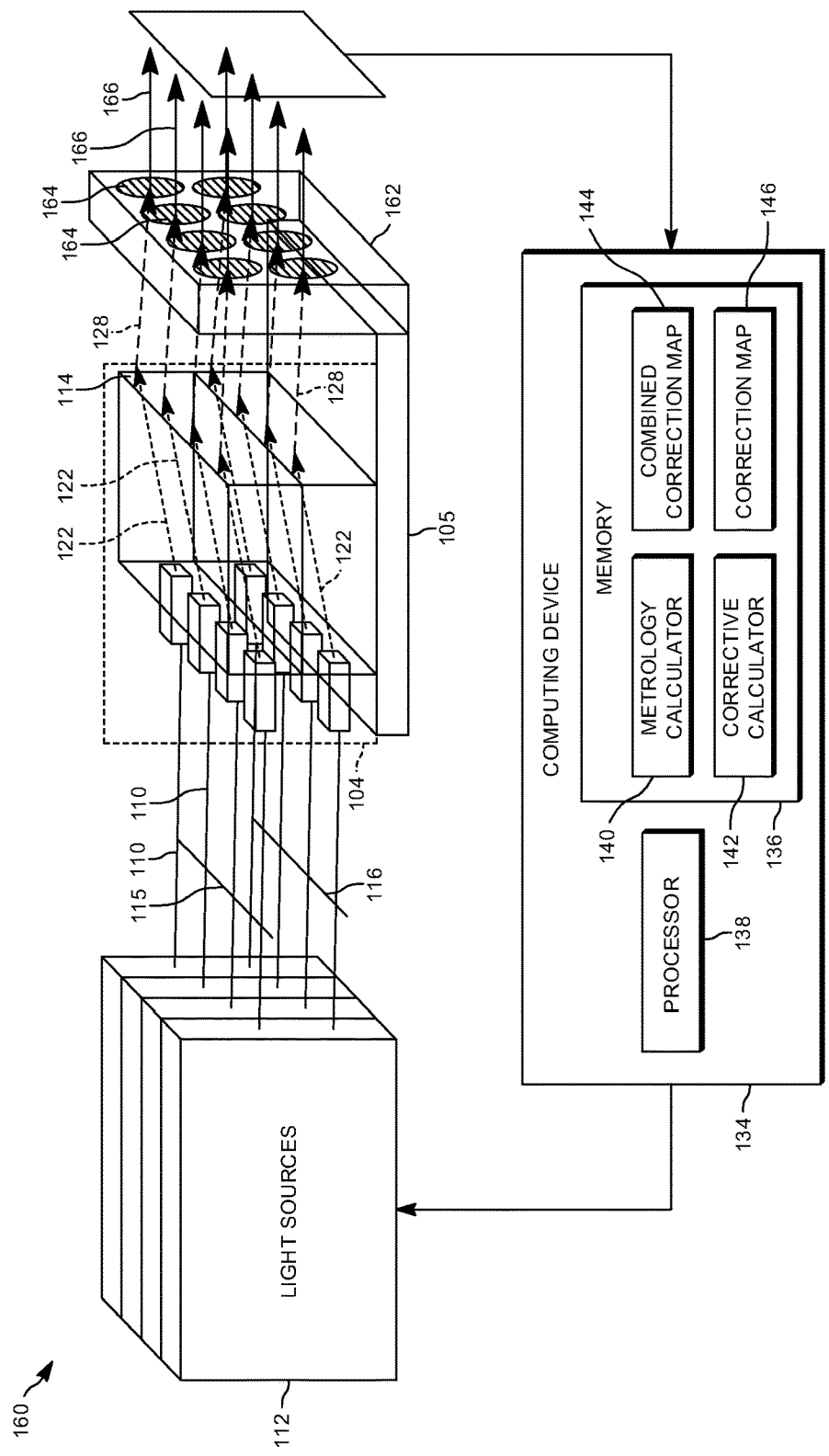

FIGS. 2-4 illustrate an example fabrication process forming a fiber launcher assembly, such as the fiber launcher assembly 50 of FIG. 1. For purposes of simplification of explanation, FIGS. 2-4 employ the same reference numbers to denote the same structure.

In FIG. 2, a diagram 100 illustrates a low precision fiber array 104 that can be formed by fusing or mechanically attaching M number of optical structures 106 together, where M is an integer greater than or equal to one (1). The low precision fiber array 104 can be affixed on a base 105. In the example illustrated in FIGS. 1-4, there are two (2) optical structures 106, but in other examples, there could be more or less optical structures 106 employed. Each optical structure 106 could be formed by attaching multiple fibers 110 to an optically transparent slab, such as a slab of monolithic material (e.g., fused silica) or to a common submount. Each of the optical structure 106 includes N number of optical inputs 108, where N is an integer greater than or equal to one (1). For purposes of simplification of explanation, only two (2) of the optical inputs 108 are labeled. It is understood that in some examples, some (or all) of the optical structures 106 could have a different number of optical inputs 108. It is to be understood that although FIG. 2 illustrates the optical inputs 108 being face-mounted onto the optical structures 106, other configurations could be employed for the low precision fiber array 104, such as a configuration illustrated in FIG. 6.

Each of the M number of optical structures 106 can be affixed together, for example by stacking, heating, fusing and/or drawing down on the M number of the optical structures 106. Such affixing allows for fiber-to-fiber spacing (often referred to as pitch), that allows for relatively close spacing of the optical inputs 108. Additionally, the optical structures 106 can be arranged in nearly any configuration. Although FIGS. 2-4 illustrate the optical structures 106 as being arranged in a rectangular configuration, other configurations, such as a hexagonal configuration can be employed.

Each of the optical inputs 108 can be formed as a fiber endcap that can be coupled to a low precision optical fiber 110 (two (2) of which are labeled) that is provided from a plurality of light sources 112. Each low precision optical fiber 110 provides an optical medium for a laser beam generated by the plurality of light sources 112. In one example, the optical structure 106 may be formed by attaching multiple optical inputs 108 to a common submount, it is possible the optical inputs 108 could be endcaps with curved surfaces to collimate or partially collimate a diverging laser beam emitted in an optical fiber 110.

The low precision fiber array 104 propagates N×M number of light beams from corresponding optical inputs 108 to an output surface 114 that opposes the optical inputs 108. Additionally, it is noted that although either N or M can be an integer equal to one, the low precision fiber array 104 propagates a plurality of light beams to the output surface 114.

FIG. 3 illustrates a diagram 120 with trajectories of light (laser) beams depicted. In the diagram 120, the light sources 112 provide an optical signal (a laser beam) to each of the optical inputs 108 of the low precision fiber array 104. Dashed lines 122 depict an example of trajectories of light beams propagating through the low precision fiber array 104 to the output surface 114. For purposes of simplification, not all of the dashed lines 122 are labeled.

Additionally, the diagram 120 includes a prefabricated microlens array 124 that includes N×M number of microlenses 126 (only two (2) of which are labeled) that each have known corrective optical properties. Dotted lines 128 (only two (2) of which are labeled) in the diagram 120 depicts an example trajectory from the output surface 114 to the microlens array 124. Each of the microlenses 126 changes a trajectory of an input light beam by a known amount. Thus, the microlens array 124 may be referred to as a "gold standard" microlens array. Light beams output by the N×M number of microlenses 126 are depicted with lines 130 (only two (2) of which are labeled). Thus, each light beam has a trajectory that is depicted by a combination of a dashed line 122, a dotted line 128 and a line 130. The microlens array 124 can provide an effective increase in brightness and/or fill-factor of each optical signal passing there through to improve the metrology accuracy and/or resolution. Further, it is noted that in some example, as discussed herein, the microlens array 124 may be omitted.

Light emitted from the microlens array 124 is detected on a metrology device 132. The metrology device 132 may include an assembly of imaging optics, detectors, actuators, and processors. The imaging optics within the measuring device 132 can be configured so as to either measure the optical field distribution at the plane of the microlens array 124, or at a plane located downstream (in the direction of light propagation) of the microlens array 124. The metrology device 132 can operate with a computing device 134 (e.g., such as a microcontroller or a general-purpose computer).

The computing device 134 can include a memory 136 and a processor 138. The memory 136 can be implemented as a non-transitory machine readable medium (e.g., volatile and/or non-volatile memory) that includes machine readable instructions executable by the processor 138. The processor 138 can be implemented as one or more processor cores. Additionally, although the computing device 134 is illustrated as being a single computer, it is understood that in some example, operations of the computing device 134 can be executed across multiple computing devices operating in concert (e.g., on a network and/or a computing cloud).

The memory 136 can include a metrology calculator 140 that can determine optical properties of light emitted from the microlens array 124. For instance, in some situations, the metrology device 132 can provide data to the computing device 134 that characterizes sensed optical properties of light beams propagating from the microlens array 124. Such properties can include, but are not limited to, an irradiance profile (signal strength), a wavefront (corresponding to diffraction), a polarization, a direction (corresponding to a trajectory), etc. One skilled in the art will appreciate the range of optical properties measurable by the metrology device 132. In this manner, the metrology calculator can determine a composite profile of the plurality of light beams emitted from the microlens array 124.

In some examples, the metrology calculator 140 can cause the computing device 134 to provide control signals to the light sources 112 to control the switching of light (laser beams) input to each of the optical fibers 110. In a first example (hereinafter, "the first example"), the metrology calculator 140 can cause the light sources 112 to sequentially provide light beams to each optical fiber 110 individually, and the metrology calculator 140 can receive metrology data characterizing each individual light beam applied to the metrology device 132. Additionally, in the first example, the imaging optics within the measuring device 132 are configured so as to measure the optical field distribution at the plane of the microlens array 124. In the first example, a position of the metrology device 132 can be adjusted to measure a near field irradiance for each light beam in the N×M array propagating from the microlens array 124. In such a situation, data characterizing the near field irradiance for each of the N×M light beams can be aggregated by the metrology calculator 140 to form the composite profile corresponding to an irradiance profile for the low precision fiber array 104.

In a second example (hereinafter, "the second example"), the metrology calculator 140 can cause the light sources 112 to output light beams on each of the N×M number of optical fibers 110 concurrently (e.g., in parallel). In the second example, the metrology device 132 and the metrology calculator 140 can employ a coherent, phase-locked source to measure the composite profile that corresponds to a wavefront profile for the low precision fiber array 104 that characterizes a wavefront of a combined output beam. Additionally, in the second example, the imaging optics within the measuring device 132 are configured so as to measure the optical field distribution at the plane located downstream of the microlens array 124 where beam footprints have spread or diffracted sufficiently such that there is substantial intensity overlap between beams.

In a third example (hereinafter, "the third example"), the metrology calculator 140 can cause (command) the light sources 112 to output light beams on each of the N×M number of optical fibers 110 sequentially, and the metrology device 132 and the metrology calculator 140 can measure a wavefront distribution of each of the N×M number of light beams using interferometry. Additionally, in the third example, the imaging optics within the measuring device 132 are configured so as to measure the optical field distribution at the plane of the microlens array 124. In such a situation, the metrology calculator 140 can record the composite profile that corresponds to a wavefront profile for the low precision fiber array 104.

The metrology calculator 140 can provide the (composite) irradiance profile or (composite) wavefront profile to a corrective calculator 142 of the memory 136 to generate a combined correction map 144 that is employable to fabricate a custom corrective optic. The custom corrective optic will be installed at the plane at which the measurement was taken (e.g., either at the microlens array 124, or some distance downstream of the microlens array 124). The combined correction map 144 characterizes a combined effect of the low precision fiber array 104 and the microlens array 124. Since the effect of the microlens array 124 is known, the corrective calculator 142 can calculate the influence on optical signals passing through the microlens array 124 and subtract the influence to generate an (updated) correction map 146 for the output of the low precision fiber array 104.

As one example, it is presumed that the microlens array 124 is a nominally periodic, two-dimensional (2D) microlens array. Additionally, it is presumed that the N×M number of microlenses 126 are spaced by a pitch distance, p in both a horizontal (x) axis and a vertical (y) axis of the microlens array 124. In such a situation, a surface height of the microlens array 124 can be characterized by Equation 1:

$$S_{microlens}(x,y) = \Sigma_{j,k} s(x+jp, y+kp) \qquad \text{Equation 1:}$$

wherein:

$S_{microlens}(x, y)$ is the summation of surface heights for a composite of the N×M number of microlenses 126;

$s(x, y)$ is the surface height of a single microlens 126, at position, x, y;

p is the pitch distance between each of the N×M number of microlenses; and j and k are summation indices from 1 to N and 1 to M respectively.

The corrective calculator 142 can implement an algorithm (procedure) to calculate the correction map 146. The particular process for determining the correction map 146 can vary as based on the procedure employed to determine the composite profile.

In the first example, wherein each optical fiber 110 is sequentially illuminated, the irradiance profile comprises a sequence of near-field (NF) irradiance profiles $NF_{j,k}(x,y)$, where the indices j=1 . . . N and k=1 . . . M denote a specific optical fiber 110). The corrective calculator 142 can employ Equations 2 and 3 to calculate an intensity-weighted centroid of a given optical fiber 110, (j,k).

$$\langle x \rangle_{j,k} = \frac{\int x NF_{j,k}(x, y) dx dy}{\int NF_{j,k}(x, y) dx dy} \qquad \text{Equation 2}$$

$$\langle y \rangle_{j,k} = \frac{\int y NF_{j,k}(x, y) dx dy}{\int NF_{j,k}(x, y) dx dy} \qquad \text{Equation 3}$$

Moreover, for each of the N×M number of optical fibers 110, the corrective calculator 142 can employ the results in Equations 2 and 3 with Equation 4 to calculate a surface height for a corrective optic, S(x, y) for the correction map 146.

$$S(x,y) = \sum_{j=1}^{N} \sum_{k=1}^{M} s(\langle x \rangle_{j,k}, \langle y \rangle_{j,k}) \quad \text{Equation 4}$$

wherein $s(\langle x \rangle_{j,k}, \langle y \rangle_{j,k})$ defines the surface height for the (j,k)$^{th}$ microlens of the corrective optic.

The corrective optic can be implemented in multiple ways. In general, the corrective optic is a freeform surface that has a height that varies as a function of position. In some examples, the corrective optic can be implemented as a microlens array. In other examples, the corrective optic can be implemented as an array of optical prisms that each have a tilt angle that is based on the composite profile of the plurality of light beams output by the microlens array 124.

In the above first example, the corrective optic fabricated using Equation 4 would replace the "gold standard" microlens array 124. Alternatively, the corrective optic could be used in series with the microlens array 124 by positioning the corrective optic optically adjacent to and in series with the microlens array 124 such that no significant diffraction occurs between the exit plane of the microlens array 124 and the plane at which the corrective optic is placed. In this case, the corrective calculator 142 could use Equation 5 in place of Equation 4 to define the surface of the corrective optic:

$$S(x,y) = \sum_{j=1}^{N} \sum_{k=1}^{M} s(\langle x \rangle_{j,k}, \langle y \rangle_{j,k}) - S_{microlens}(x,y) \quad \text{Equation 5:}$$

In the second example, wherein each of the N×M number of optical fibers 110 are illuminated concurrently, the wavefront profile includes a composite wavefront, φ(x, y) that is a function of transverse dimensions at the measurement plane located some distance downstream of the microlens array 124. A sign convention indicates that a leading edge of a wavefront is positive, and a trailing edge is negative. The correction map 146 characterizes a surface height profile, S(x, y) that is needed to conjugate a wavefront upon transmission through a fabricated corrective optic. In examples where the corrective optic is employed for transmission, the corrective calculator 142 can determine the surface height profile for the corrective optic, S(x, y) with Equation 6.

$$S(x, y) = \frac{\phi(x, y)}{n - 1} \quad \text{Equation 6}$$

wherein:

φ(x, y) characterizes the (composite) wavefront profile; and n is the index of refraction of material employed for the corrective optic.

As an alternative, in examples where the corrective optic is employed for reflection, the corrective calculator 142 can employ Equation 7 to calculate the corrective optic surface height, S(x, y).

$$S(x, y) = -\frac{\phi(x, y)}{2} \quad \text{Equation 7}$$

Alternatively, in the third example, wherein each optical fiber 110 is sequentially illuminated to calculate a wavefront profile, the wavefront profile characterizes a series of wavefronts, $\phi_{j,k}$ (x, y), where the indices j=1 . . . N and k=1 . . . M denote a specific optical fiber 110). In such a situation, if the metrology device 132 (measurement plane) is located sufficiently close to the microlens array 124 that light beams have not significantly diffracted into a neighboring light beam footprint, the composite wavefront profile, φ(x, y) can be calculated by the corrective calculator 142 with Equation 8.

$$S(x, y) = \frac{\phi(x, y)}{n - 1} - S_{microlens}(x, y) \quad \text{Equation 9}$$

i.e. for locations outside the footprint of microlens (j,k) where there is no significant energy from the (j,k)$^{th}$ fiber.

Additionally, in the third example, the corrective calculator 142 can employ Equations 6 or 7 to determine the surface height, S(x, y) for the microlenses of the corrective optic that is stored in correction map 146 in the manner described herein. In the above example, the corrective optic fabricated using Equation 8 as the input to Equations 6 or 7 would replace the "gold standard" microlens array 124. Alternatively, the corrective optic could be used in series with the microlens array 124 by positioning the corrective optic optically adjacent to and in series with the microlens array 124 such that no significant diffraction occurs between the exit plane of the microlens array 124 and the plane at which the corrective optic is placed. In this case, the corrective calculator 142 could use Equation 9 in place of Equation 6 to define the surface height of the corrective optic, where it is assumed that both the corrective optic and the microlens array 124 are made from the same transmissive optical material with the same index of refraction n.

$$\phi(x, y) = \sum_{j=1}^{N} \sum_{k=1}^{M} \phi_{j,k}(x, y) \quad \text{Equation 8}$$

wherein:

$$\phi_{j,k}(x, y) \equiv 0 \text{ for } \left(|x - jp| > \frac{p}{2}\right) \text{ or } \left(|y - kp| > \frac{p}{2}\right),$$

FIG. 4 illustrates a diagram 160 with trajectories of light (laser) beams depicted upon fabrication of the corrective optic 162. In the diagram 160, the light sources 112 provide an optical signal (a laser beam) to each of the optical inputs 108 of the low precision fiber array 104. Dashed lines 122 depict an example of the trajectory of a light beam propagating through the low precision fiber array 104 to the output surface 114.

The corrective optic 162 is fabricated based on the surface height S(x, y) that is determined in each of the first, second or third examples. The corrective optic 162 can be fabricated with standard computer numerical control (CNC) machining techniques. Moreover, the corrective optic 162 is affixed to the base 105 and spaced apart from the opposing surface 114 of the low precision fiber array 104 by a predetermined distance. In some examples, the base 105 can be shaped to define the predetermined distance between the low precision fiber array 104 and the corrective optic 162.

The corrective optic 162 includes N×M number of microlenses 164 (only two (2) of which are labeled). Dotted lines 128 (only two (2) of which are labeled) in the diagram 160 depicts an example trajectory from the output surface 114 to the corrective optic 162. Each of the microlenses 164 of the corrective optic 162 changes a trajectory of an input light beam by an amount determined by a surface height of each of the N×M number of microlenses 164. A trajectory of light beams output by the N×M number of microlenses 126 are depicted with lines 166 (only two (2) of which are labeled). Thus, each light beam has a trajectory that is depicted by a combination of a dashed line 122, a dotted line 128 and a line 166. The corrective optic 162 can output light beams that are propagated substantially in parallel and that may appear to be emitted from a (high) precision fiber array.

Additionally, in some examples the metrology calculator 140 and the corrective calculator 142 of the computing device 134 can be employed to execute another metrology process for improving the precision of the corrective optic 162. For instance, the corrective calculator 142 can employ Equations 1-9 (or a subset thereof) to determine an updated surface height S(x, y) for microlenses, and the corrective optic 162 can be refabricated in a manner described herein.

Additionally or alternatively, in some examples, multiple optical lens arrays and corrective optics can be aligned in series. For example, in some situations, the microlens array 124 and the corrective optic 162 can be aligned in series. In other examples, two (2) or more corrective optics 162 can be aligned in series. For instance, in situations where the output of the corrective optic 162 is non-satisfactory, a second corrective optic can be added in series with the (first) corrective optic 162.

Furthermore, in some examples, the N×M number of optical fibers 110 are cut (e.g., along lines 115 and 116) to provide a pigtailed fiber optic launcher that can be coupled to a different light source. By employing the process illustrated in FIGS. 2-4, high precision output of optical beams can be achieved with a low precision low precision fiber array 104. Furthermore, there is virtually no limit to the scaling of the fiber launcher assembly generated by the process in FIGS. 2-4. For instance, the N×M number of optical fibers 110 may range from 2 to about 10,000 or more. In fact, due to the tolerance of pitch between the optical inputs 108 for the optical fibers 110, reduced fiber-to-fiber spacing down to the submillimeter is possible, thereby enabling high fiber count scaling and reducing the size of the resultant fiber launcher assembly.

The output of the corrective optic 162 can be employed, for example, in a beam combiner (e.g., in a laser weapons system or a laser material processing system). As indicated by the lines 166, each of the N×M number of light beams propagates in a substantially parallel direction, such thereby increasing power efficiency of the beam combiner. As an alternative, the output of the corrective optic 162 could be provided to an information system, such as a multiplexer.

Figure 5:
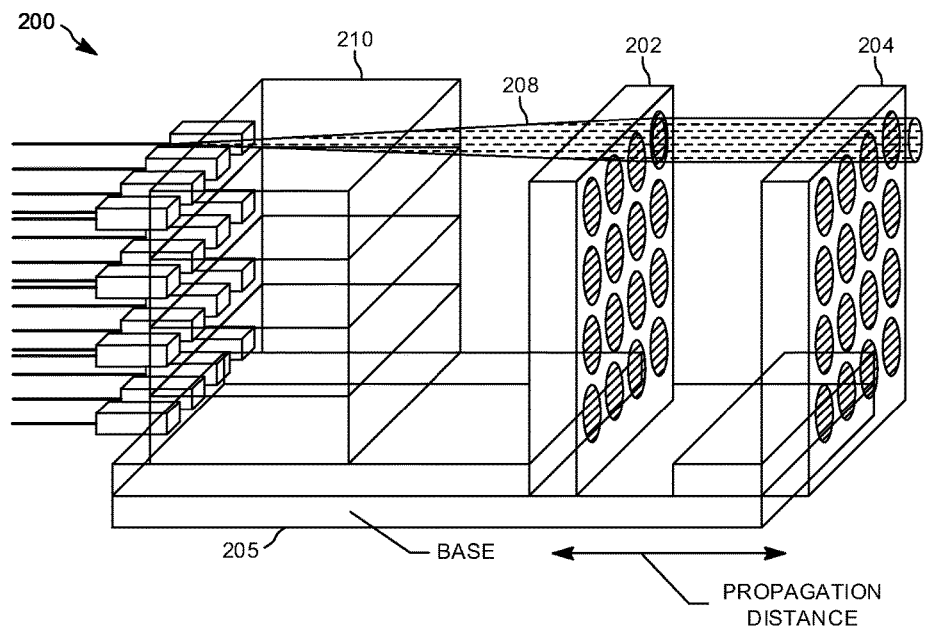
FIG. 5 illustrates another example of a fiber launcher assembly.

FIG. 5 illustrates a fiber launcher assembly 200 wherein a first corrective optic 202 and a second corrective optic 204 are aligned in series. Moreover, the fiber launcher assembly 200 includes a base 205 configured to receive both the first corrective optic 202 and the second corrective optic 204. The first corrective optic 202 and/or the second corrective optic 204 could be fabricated in a similar manner to the corrective optic 162 of FIG. 4. In particular, the first corrective optic 202 could be fabricated in a manner similar to the first or third examples described above. The second corrective optic 204 could be fabricated in a manner similar to the second example described above. Additionally, the first corrective optic 202 could be implemented as the microlens array 124 of FIG. 3. The fiber launcher assembly 200 could be fabricated, for example, by executing the process illustrated in FIGS. 2-4 multiple times.

FIG. 5 illustrates a light beam 208 that passes from a low precision fiber array 210 to the first corrective optic 202 and to the second corrective optic 204. The second corrective optic 204 can be added to perform additional wavefront and/or intensity manipulations to achieve functions such as (but not limited to) beam overlap for improved fill factor and/or beamforming. Accordingly, inclusion of the second corrective optic 204 can provide increased far field diffraction-limited central lobe power for CBC systems.

Figure 6:
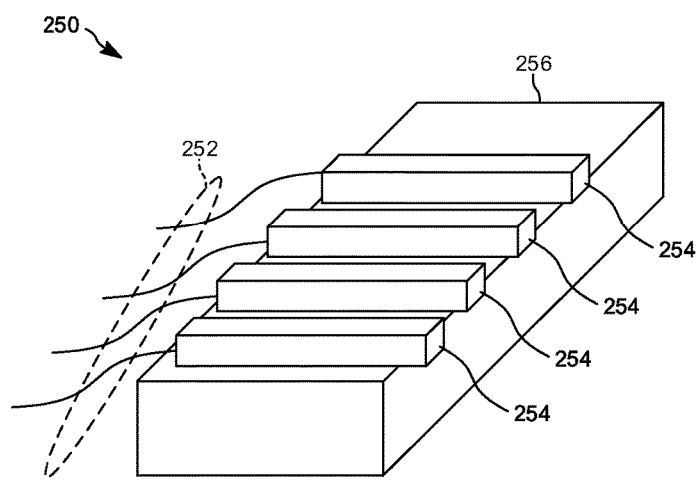
FIG. 6 illustrates an example of a low precision fiber array employable in a fiber launcher assembly.

FIG. 6 illustrates an example of an alternative configuration for a low precision fiber array 250 that could be employed to implement the low precision fiber array 60 of FIG. 1 and/or the low precision fiber array 106 of FIGS. 2-4. The low precision fiber array 250 includes a plurality of optical fibers 252 coupled to optical inputs 254. In the configuration illustrated in FIG. 6, the optical inputs 254 are formed as endcaps shaped as rectangular prisms that extend across a surface of a common submount 256. It is understood that in other configurations, multiple levels of optical inputs 252 and corresponding submounts 256 can be arranged together. Furthermore, the examples of low precision fiber arrays illustrated in FIGS. 1-6 are not meant to be exhaustive. That is, many other configuration are possible to form the low precision fiber array 250.

Figure 7:
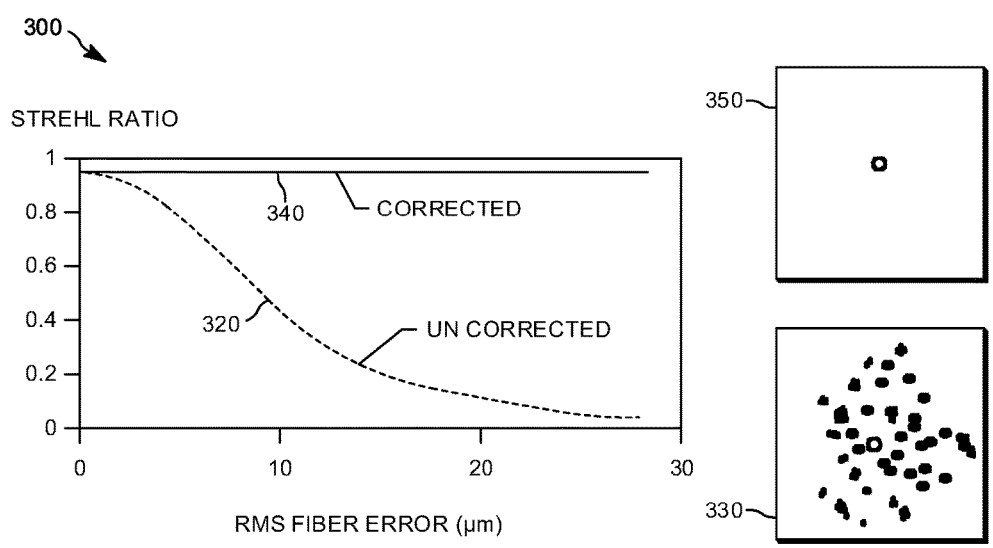
FIG. 7 illustrates a chart that plots Strehl ratio or beam combining efficiency as a function of fiber tip position variances.

FIG. 7 illustrates a chart 300 that plots a Strehl ratio (scale ranging from 0 to 100%) of a combined beam as a function of a root mean squared (RMS) fiber tip variations in micrometers (μm) of a low precision fiber array 104, which may also be referred to as pitch variations. The chart includes a plot 320 that plots an output of a fiber launch assembly without a corrective optic (e.g., the output of the low precision fiber array 104 of FIG. 2). The chart 300 includes an example far field output pattern 330 of a beam combiner that combines light beams without a corrective optic.

The chart also includes a plot 340 that plots an output of a fiber launch assembly that includes a corrective optic (e.g., the output of the corrective optic 162 of FIG. 4 and/or the output of the second corrective optic 204 of FIG. 5). The chart 300 further includes an output pattern 350 of a beam combiner that combines light beams that includes the corrective optic.

As demonstrated by the plot 340 and the output pattern 350, inclusion of the corrective optic removes wavefront errors. Accordingly, optical fibers (e.g., the optical fibers 110) can have a variance in tip position by up to about 30 μm, with less than about 0.1% drop in Strehl ratio of the combined beam.

Figure 8:
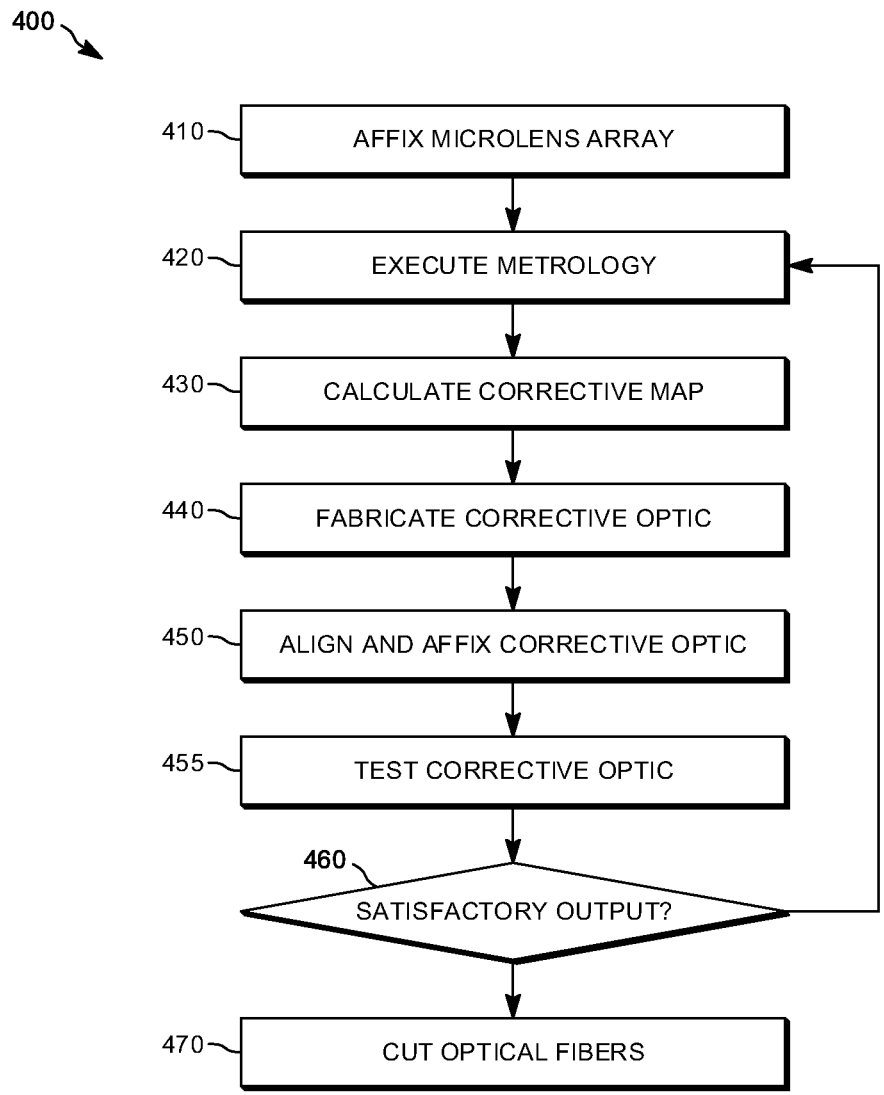
FIG. 8 illustrates a flowchart of an example method of fabricating a fiber launcher assembly.

In view of the foregoing structural and functional features described above, example methods will be better appreciated with reference to FIG. 8. While, for purposes of simplicity of explanation, the example method of FIG. 8 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 8 illustrates a flowchart of an example method 400 for fabricating a fiber launcher assembly, such as the fiber launcher assembly 50 of FIG. 1 and/or the fiber launcher assembly 200 of FIG. 5. The method 400 can be performed with the process described with respect to FIGS. 2-4.

At 410, a microlens array (e.g., the microlens array 124 of FIG. 3) can be affixed/positioned to receive light beams output by a low precision fiber array (e.g., the low precision fiber array 104 of FIG. 2). At 420, metrology can be executed by a metrology calculator (e.g., the metrology calculator 135 of FIGS. 3-4) to determine a composite profile of an output from the microlens array. Execution of the metrology can include sequential or concurrent illumination of optical fibers coupled to the low precision fiber array by an optical source. The composite profile could be an irradiance profile or a wavefront profile, as explained herein. At 430, a corrective map that includes a microlens surface height for a corrective optic is calculated by a corrective calculator (e.g., the corrective calculator 135 of FIG. 4).

At 440, the corrective optic can be fabricated using CNC (or other machining) techniques based on the corrective map. At 450, the corrective optic can be aligned and affixed in the fiber launcher, either replacing or in addition to prior microlens array or prior corrective optics. At 455, the corrected optical output of the fiber launcher can be tested using metrology. At 460, a determination can be made as to whether the output of the fiber launcher using the corrective optic is satisfactory for the particular environment of application. If the determination at 460 is negative (e.g., NO), the method 400 can return to 420. If the determination at 460 is positive (e.g., YES), the method 400 can proceed to 470. At 470, optical fibers can be cut such that the fiber launcher assembly can be coupled to another optical source.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An optical fiber launcher assembly comprising:
    a low precision fiber array that outputs a plurality of optical signals from a given side that are input into an opposing side, wherein low precision fiber array comprises:
        an optical slab forming the given side of the low precision fiber array; and
        a plurality of endcaps adhered to the optical slab, wherein each of the plurality of endcaps receives a corresponding one of the plurality of optical signals at the opposing side of the low precision fiber array; and
    a corrective optic aligned with and spaced apart from the low precision fiber array, wherein the plurality of optical signals output from the low precision array to the corrective optic have a given trajectory and optical signals output from the corrective optic have a substantially parallel trajectory different from the given trajectory.

2. The optical fiber launcher assembly of claim 1, wherein the
    plurality of endcaps are coupled to a plurality of optical fibers.

3. The optical fiber launcher assembly of claim 2, wherein the optical slap comprises a plurality of optical slabs that are stacked in a rectangular configuration.

4. The optical fiber launcher assembly of claim 2, wherein the optical fibers coupled to the plurality of endcaps have a pitch that varies by at least 1 micrometers.

5. The optical fiber launcher assembly of claim 2, wherein the optical fibers coupled to the plurality of endcaps have a pitch that varies by at least 20 micrometers.

6. The optical fiber launcher assembly of claim 1, wherein the corrective optic is a first corrective optic, the fiber launch assembly further comprising:
    a second corrective optic spaced apart and aligned with the first corrective optic.

7. The optical fiber launcher assembly of claim 1, wherein the corrective optic comprises a plurality of microlenses.

8. A method comprising:
    performing metrology on a plurality of light beams output by a low precision fiber array to determine a composite profile for the plurality of light beams;
    calculating a corrective map for a corrective optic;
    fabricating the corrective optic based on the corrective map; and
    affixing the corrective optic at a predetermined distance from a low precision fiber array, wherein light beams output by the corrective optic propagate in a substantially parallel direction.

9. The method of claim 8, further comprising:
    performing metrology on the light beams output by the corrective optic to determine if the light beams output by the corrective optic are satisfactorily aligned.

10. The method of claim 8, wherein the corrective map characterizes a surface height of each of a plurality of microlenses on the corrective optic.

11. The method of claim 10, wherein the composite profile comprises an irradiance profile that characterizes an irradiance of each of the plurality of light beams output by the microlens array.

12. The method of claim 11, wherein the transverse location of each microlens in the corrective optic is based on an intensity weighted centroid of a corresponding optical fiber coupled to the low precision fiber array.

13. The method of claim 10, wherein the composite profile comprises a wavefront profile that characterizes an individually measured wavefront of each of the plurality of light beams output by the microlens array.

14. The method of claim 13, wherein the surface height of each microlens in the corrective optic is based on an aggregate of the wavefront of each of the plurality of light beams output by the low precision fiber array and an index of refraction of material forming the corrective optic.

15. The method of claim 10, wherein the composite profile comprises a wavefront profile that characterizes and a concurrently measured wavefront of the plurality of light beams output by the low precision fiber array.

16. The method of claim 8, wherein the corrective map characterizes a surface height of a freeform surface.

17. The method of claim 16, wherein the surface height of the freeform surface varies based on a surface height of each microlens in the microlens array.

18. The method of claim 8, wherein the corrective optic is fabricated with computer numerical control (CNC) machining techniques.

19. A method comprising:
    performing metrology on a plurality of light beams that pass through a low precision fiber array to determine a composite profile for the plurality of light beams;
    fabricating the corrective optic based on a corrective map that characterizes a surface height of a plurality of microlenses in the corrective optic and the corrective map is based on the composite profile; and
    affixing the corrective optic a predetermined distance from the low precision fiber array, wherein light beams output by the corrective optic propagate in a substantially parallel direction.

20. The method of claim 19, wherein the plurality of light beams that pass through the low precision fiber array comprises at least 10 light beams.

* * * * *